Figure 1:
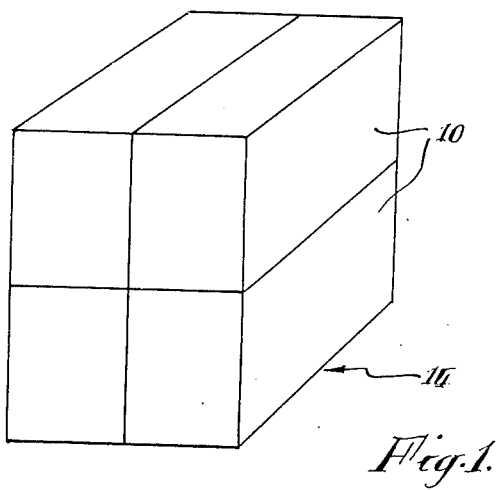

United States Patent [19]
Hughes et al.

[11] 3,933,244
[45] Jan. 20, 1976

[54] SHRINK-WRAPPING OF ARTICLES

[75] Inventors: Merfyn Jones Hughes, Little Sutton; Derek William Shorten, Westerfield; Graham Westley Smith, Witnesham, all of England

[73] Assignee: Bakelite Xylonite Limited, London, England

[22] Filed: Dec. 5, 1973

[21] Appl. No.: 421,812

[30] Foreign Application Priority Data
Dec. 12, 1972  United Kingdom........... 57461/72

[52] U.S. Cl. .................... 206/497; 53/30; 161/410; 229/3.5; 229/DIG. 12
[51] Int. Cl.² .................... B65D 65/00; B65B 53/02
[58] Field of Search ............ 206/497, 386; 229/3.5, 229/DIG. 12; 161/254, 402, 410, 413, 117; 53/30

[56] References Cited
UNITED STATES PATENTS

| | | | |
|---|---|---|---|
| 3,396,901 | 8/1968 | McFeories, Jr. ................. | 229/3.5 R |
| 3,558,399 | 1/1971 | Turner................. | 161/254 |
| 3,597,754 | 12/1970 | Tokos et al. .................... | 229/3.5 R |
| 3,650,775 | 3/1972 | Simon et al.......................... | 206/497 |
| 3,681,092 | 8/1972 | Titchenal et al..................... | 206/497 |
| 3,713,965 | 1/1973 | Widiger et al. ...................... | 206/497 |
| 3,825,113 | 7/1974 | Kramer et al........................ | 206/386 |
| 3,878,943 | 4/1975 | Ryan et al........................... | 206/497 |
| 3,884,935 | 5/1975 | Burns................................ | 206/497 |

*Primary Examiner*—William I. Price
*Assistant Examiner*—Bruce H. Bernstein
*Attorney, Agent, or Firm*—Brisebois & Kruger

[57] ABSTRACT

Double-wrap shrink-pack, and method of making it comprising wrapping at least one article in an ethylene polymer film, preferably a polyethylene film, to give a package, and shrink-wrapping a plurality of such packages in an ethylene polymer film, preferably a polyethylene film, to give a double-wrap shrink-pack, wherein one of said films, preferably the second of said films, contains an amount of anti-block additive and the other of said films is substantially free of anti-block additive.

26 Claims, 3 Drawing Figures

SHRINK-WRAPPING OF ARTICLES

This invention relates to double-wrap shrink packs which employ heat-shrinkable polyethylene film.

Polyethylene films having the property of heat-shrinkability have been known for some time. They are usually made by stretching a film of the polymer at a suitable temperature. This imparts some orientation to the molecules and rapid cooling can lock the molecules in this orientated condition. This condition is one of strain of the molecular structure which can be relieved by raising the temperature of the film to a suitable level when it will shrink back to, or approximately to, its unstrained state. The film is called a heat-shrinkable film when it is in the strained state.

Considerable use has been made of this property of heat-shrinkability in the field of packaging. When an article is wrapped in a heat-shrinkable polyethylene film and is then passed through a heating device, e.g. an oven, where its temperature is raised sufficiently to relieve the strain imparted by stretching, it is found that the film shrinks around the article to give a tightly heat-shrunk package. This use of heat-shrinkable film is not restricted to the wrapping of single articles and for some years it has been common practice to shrink-wrap a number of articles in one shrink-wrapping of heat-shrinkable polyethylene film, e.g. packages of, say, 10 boxes of medical supplies such as bottles of insulin, and, when suitable light locating fitments are provided, six or more bottles or cans of liquid or solid materials.

This shrink-wrapping of articles in polyethylene film can be extended in two ways to provide what we define as a double-wrap shrink pack. The first of these involves the collation of a number of shrink-wrapped packages of the above-described kind and then shrink-wrapping them in a heat-shrinkable polyethylene film. The second of these ways is to seal-wrap the articles in a polyethylene film (which can be a heat-shrinkage type, but can also be a conventional type of film having low heat-shrinkage) to provide packages which are not heat-shrunk prior to collation in groups. The collations are then shrink-wrapped in a heat-shrinkable polyethylene film. During this shrink-wrapping, there may occur some small shrinkage of the film in which the articles have been seal-wrapped, but this does not tighten it to any marked extent.

For purposes of clarity of description, it is convenient to introduce some nomenclature. Thus, the packages making up the collation are described as primary packages and the film used for these packages as primary film. The film which is used to shrink-wrap the collation of packages is described as the secondary film.

Double-wrap shrink packs can be produced when both the primary and secondary films are made from the same polyethylene extrusion compound. However, it is found that the heat-shrinking of the secondary film causes areas of it to contact firmly, while still in a heat-softened condition, on areas of the primary film leading to local fusing together of the two films. This prevents easy removal of primary packages from a double-wrap shrink pack.

Various methods have been tried to overcome this problem of fusion of one film to another. Thus, it has been suggested that dissimilar thermoplastic polymeric films should be used, e.g. polyvinyl chloride film for the primary film and polyethylene film for the outer secondary film. While such packs have exhibited no fusion difficultires, they have had the disadvantage of the low-temperature brittleness of the polyvinyl chloride film at deep-freeze temperatures. Additionally, they are made expensive because of the higher cost of polyvinyl chloride film relative to polyethylene films.

Another method has been to apply surfactant solutions to the outside surface of the primary film or to the inside surfaces of the secondary film just prior to the heat-shrinking of the secondary film. Thus, for example, a 5% aqueous solution of "Teepol" (Trade Mark of Shell Chemical Ltd.) has been applied on to either primary or secondary film. This treatment largely prevented fusion of the primary and secondary films when the secondary film was heat-shrunk, but it was found to be messy, to lead to the coating of heat-sealing bars with dried surfactant, and also to be distributed non-uniformly, especially when the film was wrinkled.

Another method has been to silicone-coat the polyethylene film. This suffers from the disadvantages of increased cost and degrading of the heat-sealing characteristics.

A further method has been to spray talc or chalk on to the polyethylene film, but difficulties have been found to arise from contamination of the pack by the powder. The powder also causes heat-sealing difficulties.

One more method of overcoming this fusion problem has been to print suitable non-stick lacquers on to the film. While this can be an effective remedy for overcoming fusion difficulties, it suffers from the fact that it adds substantially to the cost of the film.

According to the present invention, there is provided a method for making a double-wrap shrink pack which comprises first either (A) seal-wrapping or (B) shrink-wrapping articles in a type of polyethylene film, which can be heat-shrinkable (for A or B) or not heat-shrinkable (for A only), to form packages, and then collating a number of these packages following which the collation of packages is shrink-wrapped in a second film which is of the heat-shrinkable type, with the two films employed being characterized by the fact that one is substantially free from anti-block additive (that is to say no more than 0.50% by weight) while the other contains an anti-block additive which is present in an amount sufficient to prevent fusion together of the two types of film during the shrink-wrapping of the collation but which amount is insufficient to reduce significantly the heat-sealability of this film.

This invention also provides a double-wrap shrink pack comprising a collation of article-containing packages which have been shrink-wrapped using one type of heat-shrinkable polyethylene film or a collation of article-containing packages which have been seal-wrapped using the same heat-shrinkable polyethylene film or a conventional polyethylene film, and which collation is shrink-swrapped in another type of heat-shrinkable polyethylene film, characterized by the fact that one of the two types of film used in this double-wrap shrink pack is substantially free from anti-block additive while the other contains sufficient to prevent fusion together of the two types of film during the shrink-wrapping of the collation but which amount is insufficient to reduce significantly the heat-sealability of this film.

The method of the present invention can employ any conventional apparatus for shrink-wrapping. The usually preferred type involves a film-wrapper and shrink-tunnel. The packs travel through a tunnel heater in which the heating means can be a forced draught of heated air. They are operated in conjunction with equipment for heat-sealing the polyethylene films. They can also be used in conjunction with means for collating articles. One usually uses one film-wrapper/shrink-tunnel combination for preparing the primary heat-shrunk packages, then collates a number of these packages which are then passed through a second film-wrapper/shrink-tunnel arrangement to heat-shrink the secondary film to give the required double-wrap shrink pack. If the primary packages are not heat-shrunk, they are merely seal-wrapped before collation.

The film-wrapper provides the means of making the type of wrapping chosen as suitable for the particular packaging job being undertaken. Its sealing electrodes can be, for example, of the single-bar type or of the L-shape type, the latter being used with centre-folding polyethylene film. Examples of suitable types of shrink wrapping are sleeve-wrapping and overall-wrapping.

Polyethylene films used in this invention can be made from extrusion compounds based on any of the usual film-making grades of polyethylene itself, in which case the polymer will usually be one of the commercial low-density polyethylenes, but medium-density and high-density polyethylenes can be used. Films make from other polyethylenes can also be used, for example films from copolymers of ethylene and an unsaturated ester of a carboxylic acid, e.g. vinyl acetate or ethyl acrylate. The most important of such polyethylenes is an ethylene-vinyl acetate copolymer, which, for economic reasons, advantageously comprises at least 90 %, preferably at least 96 %, by weight of ethylene units.

The films are usually made from an extrusion compound by the well-known layflat process. This process can be run to give what has been described above as conventional polyethylene film or can be run to give more orientation of the polyethylene polymer chains and so produce a film of higher heat-shrinkage. Normally, the thickness of a primary film will be 30 to 50 microns while that of a secondary film may be from 50 to 250 microns, but these figures are not to be regarded as restrictive.

An important feature of this invention is that its method and pack require the use of two types of polyethylene film. One is a film made from an extrusion compound comprised by polyethylene with which may be mixed small amounts of anti-oxidants, anti-static agents, colourants, etc.. The second type is made from an extrusion compound which is based on a polyethylene which is identical with or similar to, that used to make the first type of film. The small amounts of anti-oxidants, anti-static agents, colourants, etc. which are present in the first type of film can be present in the second type of film, but it is essential for the purposes of this invention that the extrusion compound used to make the latter type contains an amount of an anti-block additive. This anti-block additive must be substantially absent (that is to say no more than 0.50 % by weight present) from the extrusion compound used for the first type of film. The amount of the anti-block additive in the extrusion compound used for the second type of film must be such that it will not significantly reduce the heat-sealability of the film, but it must be sufficient to prevent fusion together of primary and secondary films during the shrink-wrapping of a collation of seal-wrapped or shrink-wrapped packages.

An anti-block additive for use in the present invention should be a high-melting, long-chain organic compound of a waxy nature. Its compatibility with a polyethylene used for films intended for the invention should be such that it exudes to the surface of such films. We have found that N,N'-bis-(long-chain alkoyl)-alkylene diamines having melting points lying between 100° and 180°C are suitable for use in the invention. N,N'-distearoyl-ethylene diamine (melting point 138° and to 142°C) has been found to be very effective.

The anti-block additive used in one of the two types of film employed in making the double-wrap shrink packs of the present invention must not be confused with the slip agents which are conventionally incorporated in polyethylene extrusion compounds in order to reduce the friction coefficients of films made from them. Examples of such slip agents are lauramide, myristamide, palmitamide, stearamide, oleamide, erucamide and behenamide. Small amounts (0.1 to 0.50% by weight, for example) of these slip agents may be present in the films (that is in either or both of the films) employed in the present invention. These same compounds, however, which act as slip agents when present in small amounts, can be used in higher amounts as anti-block additives according to the invention. The use of these compounds in these higher amounts is of course appropriate for only one of the two types of polyethylene films used in the present process, since in these higher amounts they are acting as anti-block additives and, as explained above, only one of the two types of film may contain an effective antiblocking amount of the additive. The second film may, as will be apparent from the foregoing, contain the same compound in an amount in which it is effective as a slip agent.

As has been stated earlier, the amount of anti-block additive incorporated with polyethylene in the extrusion compound used to make the one type of film containing anti-block additive has to be such that the film has good heat-sealability, i.e., the film can be heat-sealed to itself to give a strong bond. At the same time, the film should exhibit no tendency to fuse to the other polyethylene film during the shrink-wrapping of a collation of primary packages. Each of the mentioned anti-block additives is commercially available and its properties are well documented. For each anti-block additive there are recommended minimum amounts that will be effective to prevent blocking; this may be known as the effective anti-blocking amount. It has been found that at certain higher amounts the additive will also prevent the heat-sealing of the film to itself using normal commercial heat sealing apparatus; this may be known as the self-heat-sealing-preventing amount. The amount of anti-block additive used in the film should be between these two amounts. It has been found that these requirements are met when the content of the anti-block additive lies between 1.0 to 2.5 % by weight of the polyethylene present in the extrusion compound.

In carrying out the present invention, it is advantageous that the film containing the anti-block additive is the secondary film, namely the outer of the two films of the double-wrap shrink-pack. The use of an anti-block additive in a film adds slightly to the cost of the film, and since less secondary film is used than primary film, it is economically advantageous to use the anti-block additive in the secondary film. Furthermore the presence of the anti-clock additive may cause a slight increase in the time required to heat-seal the film, although the additive is of course present in an amount below the self-heat-sealing preventing amount. Such an increase in the heat-sealing time can better be tolerated for the secondary film than for the primary one as the number of secondary packages to be made is considerably less than the number of primary packages.

Figure 2:
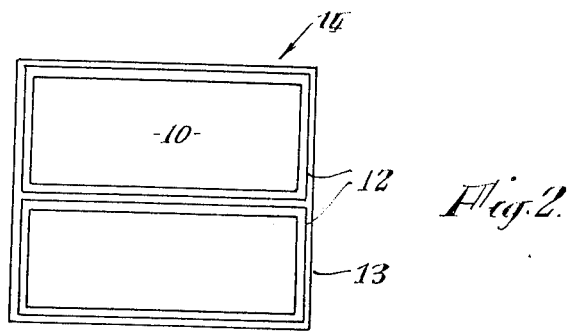
Figure 3:
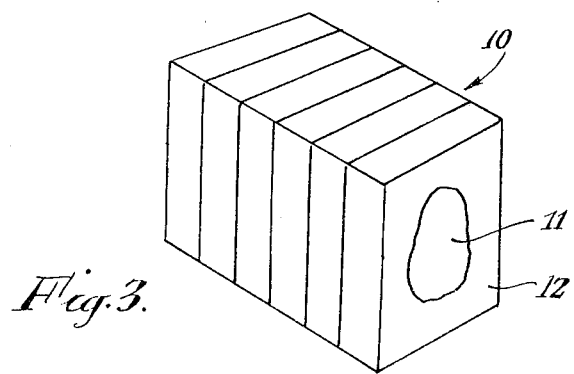

An exemplary embodiment of a double-wrap shrink pack according to the invention will now be described with reference to th accompanying drawings, in which like numerals denote like parts throughout the several vieiws. and in which FIG. 1 is a schematic representation of a double-wrap shrink pack, viewed in perspective, consisting of a plurality of primary packages, FIg. 2 is a slightly exploded schematic vertical cross-section through the double wrap shrink pack of FIG. 1, and FIG. 3 is a perspective view of a single primary package, constituting one of the primary packages of the double-wrap pack of FIG. 1.

Referring to the drawings, a primary package 10 (as shown in FIG. 3) consists of a collation of six cardboard cartons 11 that has been shrink-wrapped in a primary polyethylene film 12. A plurality (four) of these primary packages 10 have been collated into a stack 2 × 2 and then shrink-wrapped in a secondary polyethylene film 13. In the resulting double-wrap shrink pack 14, each primary package 10 is wrapped in a primary film 12 and the entire stack of these primary packages 10 is wrapped in a secondary film 13, as can clearly be seen in FIG. 2.

In an alternative embodiment according to the invention, the primary package 10 could be seal-wrapped (instead of shrink-wrapped) in a primary polyethylene film 12. These seal-wrapped primary packages 10 could then be collated into a stack as described above, and the entire stack then be shrink-wrapped as above in a secondary polyethylene film 13.

In both of these embodiments, one of the polyethylene films (either the primary film 12 or the secondary film 13, but preferably the latter for the reasons previously explained) contains an anti-block additive in an amount between the effective anti-blocking amount and the self-heat-sealing-preventing amount. The other polyethylene film, preferably the primary film 12, is substantially free from any anti-block additive (that is to say that it either contains no anti-block additive or it contains it in an amount no greater than 0.5% by weight). The presence of the anti-block additive in only one of the two films 12, 13 prevents fusion between the secondary film 13 and the exposed areas of the primary film 12, when the collation of primary packages 10 is shrink-wrapped in the secondary film 13.

It will of course be appreciated that the primary package shown, consisting of six cardboard cartons 11, is merely an example from a very wide range articles that could be contained within the package. The primary package 10 could, moreover, contain only one article, or could contain any desired number of articles arranged in any convenient manner. The number of primary packages 10 contained in the double-wrap pack 12 may be two or more, and again these may be arranged in any convenient manner.

The following two examples give, again by way of exemplification only, details of experiments that have been carried out, from which further details of various embodiments of the invention will be apparent.

EXAMPLE 1

Heat-shrinkable film of 50 micron thickness was made from each of the formulations given below in Table 1.

TABLE 1

| Ingredients | FORMULATION (parts by weight) | | | | | |
|---|---|---|---|---|---|---|
| | A | B | C | D | E | F |
| Polyethylene | 100 | 99.25 | 99.0 | 98.5 | 98.0 | 97.0 |
| N,N'-distearoyl-ethylene diamine | 0 | 0.75 | 1.0 | 1.5 | 2.0 | 3.0 |

The polyethylene had a density of 0.920 g.cm$^{-3}$ and a Melt Flow Index of 2.0 (as determined by Method 105 C, British Standard 2782 (Part 1), 1956). The N,N'-distearoyl ethylene diamine was incorporated with the polyethylene by first banburying the two ingredients together and then feeding the material from the banbury mixer to an extruder fitted with a tubular die from which was extruded a tube which was blown suitably to give a heat-shrinkable film of 50 microns thickness.

All six resultant films were examined for heat-sealability by using them in conventional heat-sealer (in this case, a C. F. Taylor (Unity Designs) Ltd. cross-feed sealer). The seals were examined and judgment of their quality is recorded below in Table 2.

Shrink-wrapped (primary) packages were made by placing together two cubical wooden blocks, each of 3-inch edge, which were then curtain-wrapped and heat-shrunk by passing them through a C. F. Taylor (Unity Designs) Ltd. shrink-tunnel, using Film A. Ten double-wrap shrink packs were then prepared. For each of these, six of the primary shrink-wrapped packages were collated and then passed through the same shrink-tunnel after being curtain-wrapped in Film A (secondary film) which became heat-shrunk. This experiment was repeated, still using Film A as primary film, but utilising as secondary film successively, Films B, C, D and E. Film F was not used because as will be seen in Table 2, it had poor heat-sealability. The resultant double-wrap heat shrink packs were then examined for occurrence of fusion between the primary and secondary films. The results of these examinations are noted in the column headed "Fusion to Film A" in Table 2.

TABLE 2

| Film | Heat Sealability | Fusion to Film A |
|---|---|---|
| A | Good | Considerable |
| B | Good | Slight |
| C | Good | None |
| D | Good | None |
| E | Good | None |
| F | Poor | — |

In addition, an experiment on the same lines was run on the same shrink equipment as that described above, but using Film C as the primary film and Film A as the secondary film. No fusion of these two films could be observed in the double-wrap shrink packs.

EXAMPLE 2

This example illustrates the making of a double-wrap shrink pack in which the primary article-containing packages were not heat-shrunk.

Pairs of ladies nylon stockings were overall seal-wrapped in Film A using it as a centre-fold film and sealing the film by means of an L-type sealer. Twenty of the resultant primary packages were collated and then shrink-wrapped by passing the collation through the shrink-tunnel used in Example 1, using Film C as the secondary film. No fusion of primary and secondary film could be seen in the double-wrap shrink packs made in this experiment.

We claim:

1. Method of making a double-wrap pack which comprises wrapping at least one article in a first ethylene polymer film to form a first package, collating a plurality of said packages to form a collation, and shrink-wrapping said collation in a second ethylene polymer film, which is heat-shrinkable, to form a second package, wherein one of said films contains an anti-block additive present in an amount between the effective anti-blocking amount of said additive and the self-heat-sealing-preventing amount of said additive, and the other of said films is substantially free from anti-block additive.

2. The method of claim 1, wherein said first package is made by seal-wrapping at least one article in said first ethylene polymer film.

3. The method of claim 1, wherein said first package is made by shrink-wrappng at least one article in said first ehtylene polymer film, said first ethylene polymer film being a heat-shrinkable film.

4. The method of claim 1, wherein at least one ethylene polymer film is a polyethylene film.

5. The method of claim 4, wherein at least one polyethylene film is a low-density polyethylene film.

6. The method of claim 1, wherein at least one ethylene polymer film is an ethylene-vinyl acetate copolymer film.

7. The method of claim 6, wherein at least one ethylene-vinyl acetate polymer film has an ethylene unit content of at least 90 % by weight of the copolymer.

8. The method of claim 6, wherein at least one ethylene-vinyl acetate polymer film has an ethylene unit content of at leat 96 % by weight of the copolymer.

9. The method of claim 1, wherein the anti-block additive is selected from the group consisting of lauramide, myristamide, palmitamide, stearamide, oleamide, erucamide, and behenamide.

10. The method of claim 1, wherein the amount of anti-block additive in the anti-block additive-containing film is in the range of from 1.0 to 2.5 % by weight of the ethylene polymer.

11. The method of claim 1, wherein said first ethylene polymer film is substantially free from anti-block additive, and said second ethylene polymer film contains anti-block additive.

12. The method of claim 1, wherein at least one ethylene polymer film is a ethylene ethyl-acrylate copolymer film.

13. The method of claim 12, wherein at least one ethylene ethyl-acrylate copolymer film has an ethylene unit content of at least 90% by weight of the polymer.

14. The method of claim 12, wherein at least one ethylene ethyl-acrylate copolymer film has an ethylene unit content of at least 96% by weight of the copolymer.

15. Double-wrap pack comprising a collation of a plurality of first packages each comprising at least one article wrapped in first ethylene polymer film, said collation being shrink-wrapped in a second ethylene polymer film, wherein one of said film contains an anti-block additive present in an amoutn between the effective anti-blocking amount of said additive and the self-heat-sealing-preventing amount of said additive, and the other of said films is substantially free from anti-blocking additive.

16. Double-wrap pack according to claim 15, wherein said first ethylene polymer film is substantially free from anti-block additive, and said second ethylene polymer film contains anti-block additive.

17. Double-wrap pack according to claim 15, wherein each of said first packages comprises at least one article seal-wrapped in said first ethylene polymer film.

18. Double-wrap pack according to claim 15, wherein each of said first packages comprises at least one article shrink-wrapped in said first ethylene polymer film.

19. Double-wrap pack according to claim 15, wherein each ethylene polymer is polyethylene.

20. Double-wrap pack according to claim 15, wherein the anti-block additive is N,N'-distearoyl-ethylene diamine.

21. Method of making a double-wrap pack which comprises wrapping at least one article in a first ethylene polymer film to form a first package, collating a plurality of said packages to from a collation, and shrink-wrapping said collation in a second ethylene polymer film, which is heat-shrinkable, to form a second package, wherein one of said films is substantially free from anti-block additive, and the other of said films contains as an anti-block additive an N,N'-bis-(long-chain alkoyl)-alkylene diamine having a melting point within the range of from 100° to 180°C present in an amount between the effective anti-blocking amount of said additive and the self-heat-sealing-preventing amount of said additive.

22. The method of claim 21, wherein the anti-block additive is N,N'-distearoyl-ethylene diamine.

23. The method of claim 21, wherein said first ethylene polymer film is of a thickness within the range of from 30 to 50 microns, and wherein said second ethylene polymer film is of a thickness within the range of from 50 to 250 microns.

24. Method of making a double-wrap pack which comprises wrapping at least one article in a first ethylene polymer film having a thickness within the range of from 30 to 50 microns to form a first package, collating a plurality of said packages to form a collation, and shrink-wrapping said collation in a second ethylene polymer film having a thickness within the range of from 50 to 250 microns, which second film is a heat-shrinkable film, to form a second package, wherein one of said films contains an anti-block additive present in an amount between the effective anti-blocking amount of said additive and the self-heat-sealing-preventing amount of said additive, and the other of said films is substantially free from anti-block additive.

25. Double-wrap pack comprising a collation of a plurality of said first packages each comprising at least one article wrapped in a first ethylene polymer film, said collation being shrink-wrapped in a second ethylene polymer film, wherein one of said films is substantially free from anti-block additive, and the other of said films contains as an anti-block additive an N,N'-bis-(long-chain alkoyl)-alkylene diamine having a melting point within the range of from 100° to 180°C present in an amount between the effective anti-blocking amount of said additive and the self-heat-sealing-preventing amount of said additive.

26. The double-wrap pack of claim 25 in which said anti-block additive is N,N'-distearoyl-ethylene diamine.

* * * * *

UNITED STATES PATENT OFFICE
CERTIFICATE OF CORRECTION

PATENT NO. : 3,933,244
DATED : January 20, 1976
INVENTOR(S) : Merfyn Jones Hughes et al It is certified that error appears in the above-identified patent and that said Letters Patent are hereby corrected as shown below:

[30] Foreign Application Priority Data

Dec. 13, 1972   United Kingdom........57461/72

Signed and Sealed this twenty-third Day of March 1976

[SEAL]

Attest:

RUTH C. MASON
Attesting Officer

C. MARSHALL DANN
Commissioner of Patents and Trademarks